United States Patent [19]

Dutcher et al.

[11] Patent Number: 5,003,723
[45] Date of Patent: Apr. 2, 1991

[54] FISHING LURE

[76] Inventors: Davy L. Dutcher, R.D. #5, Upper Front St., Binghamton, N.Y. 13901; Ronald H. Secoolish, Box 191, Whitney Point, N.Y. 13862

[21] Appl. No.: 394,920

[22] Filed: Aug. 17, 1989

[51] Int. Cl.$^5$ .............................................. A01K 85/00
[52] U.S. Cl. .................................... 43/42.13; 43/42.27
[58] Field of Search ................ 43/42.09, 42.11, 42.13, 43/42.15, 42.26, 42.27, 42.5

[56] References Cited

U.S. PATENT DOCUMENTS

| | | | |
|---|---|---|---|
| 2,334,792 | 11/1943 | Royston | 43/42.26 |
| 2,619,764 | 12/1952 | Mellin | 43/42.13 |
| 2,758,409 | 8/1956 | Eslinger | 43/42.15 |
| 2,760,294 | 8/1956 | Morrill | 43/42.27 |
| 2,881,548 | 4/1959 | Backe | 43/42.11 |
| 2,984,928 | 5/1961 | Jenkins | 43/42.09 |
| 3,055,138 | 9/1962 | Mutti | 43/42.5 |
| 3,363,358 | 1/1968 | Johansson | 43/42.13 |
| 4,210,984 | 7/1980 | Koenig | 43/42.09 |

*Primary Examiner*—Kurt Rowan
*Attorney, Agent, or Firm*—Salzman & Levy

[57] ABSTRACT

The invention features a fishing lure that simulates the natural movements and swimming action of a fish by virtue of articulated fin and body sections that are free to swing back and forth under the action of tidal forces or the play in the fishing line. The simulated movement attracts other fish and induces them to strike at the bait.

19 Claims, 2 Drawing Sheets

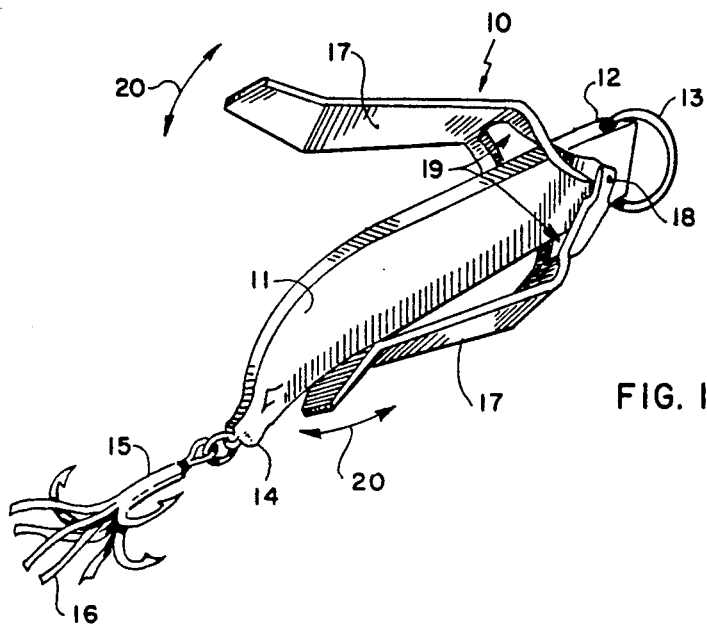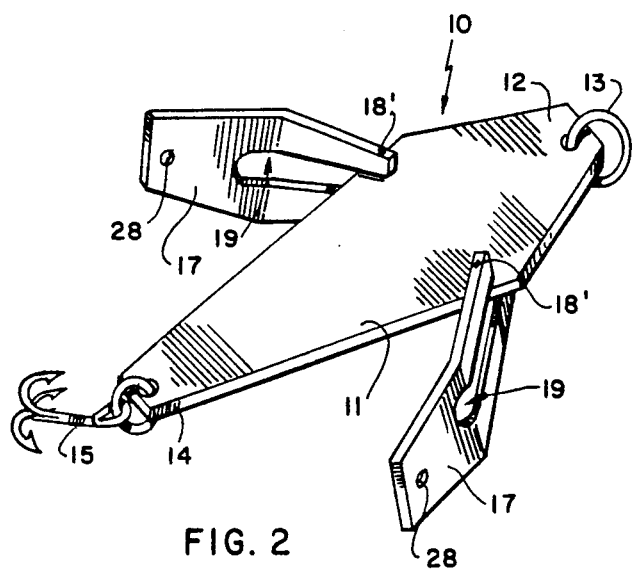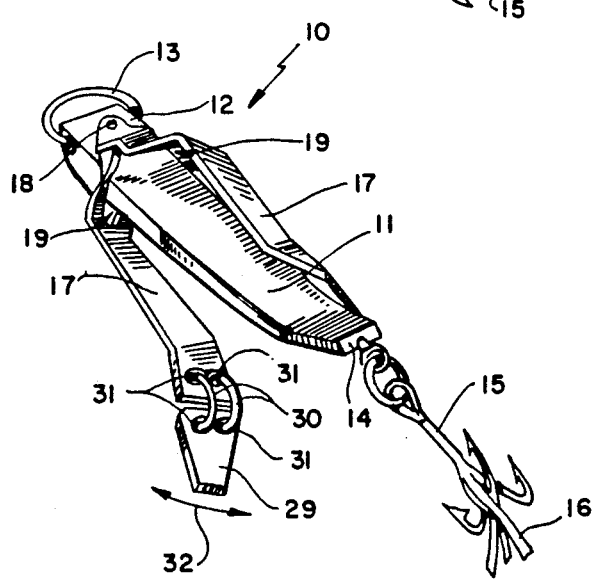

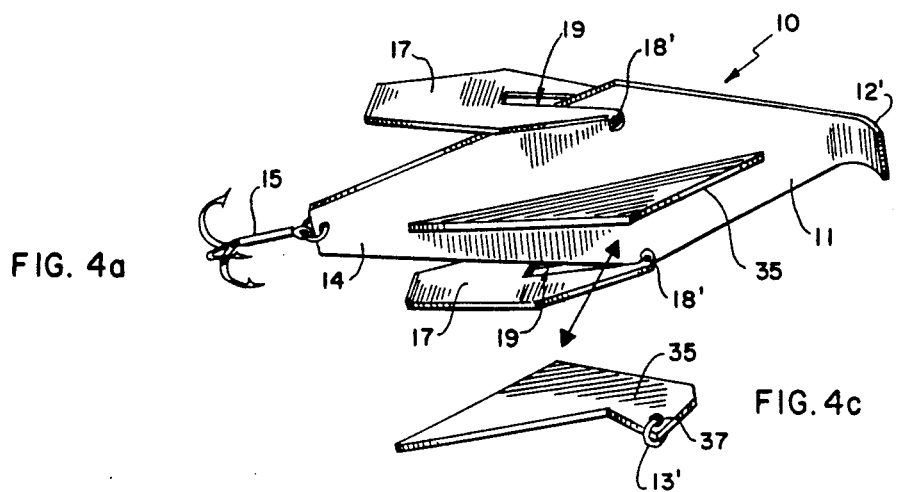
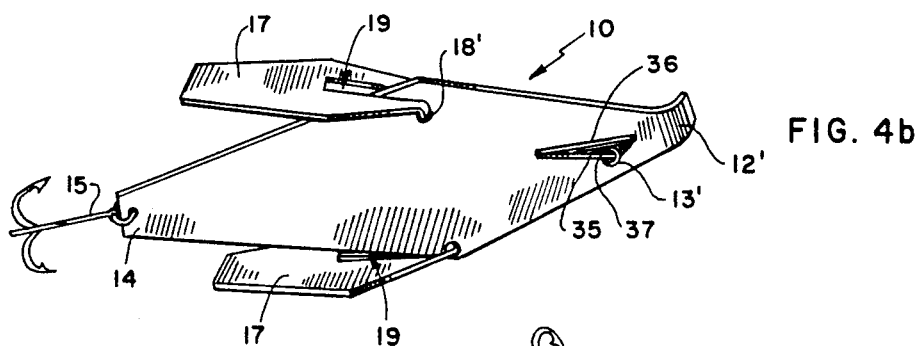
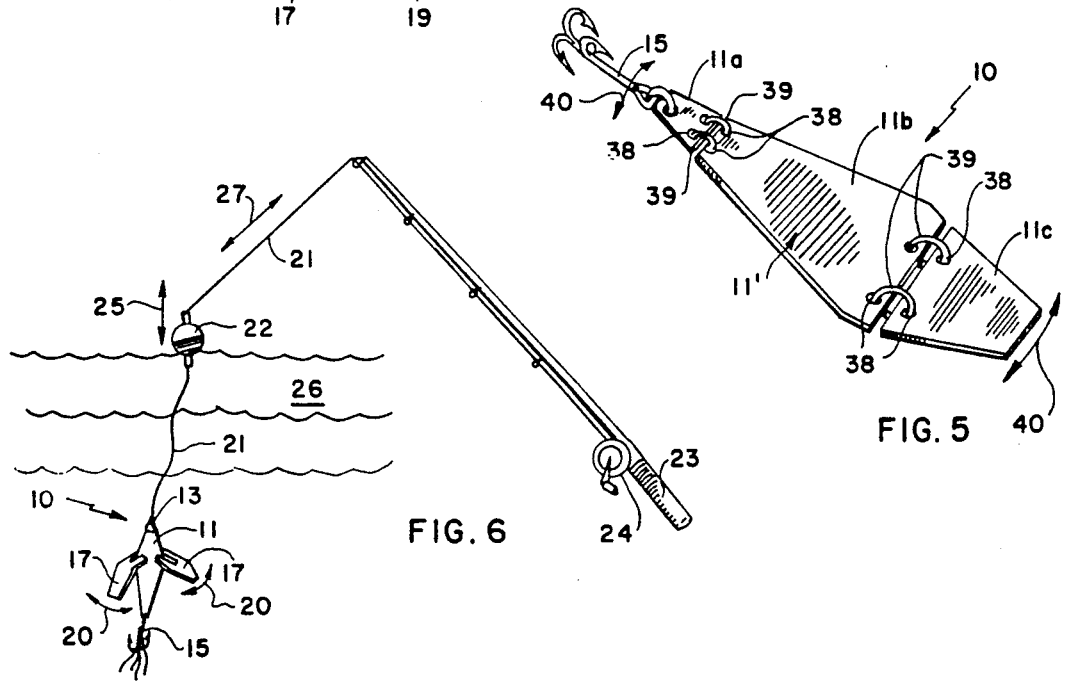

FISHING LURE

Field of the Invention

This invention relates to fishing lures, and more particularly to a vertical jigging fishing lure that simulates the swimming motions and actions of a fish or insect.

BACKGROUND OF THE INVENTION

The designers of fishing lures have as their main object the attraction of fish.

Recent studies have shown that fish are attracted to other fish in a variety of ways that involve sight, smell and motion sensing.

Most fishing lures in the past focused mainly on the aspect of sight, i.e., designing the lure to be a look-alike of another fish or insect upon which a particular fish feeds. For example, if a particular fish such as a trout feeds upon flies, the lure was designed to resemble a fly.

One of the best ways to attract a fish is to simulate the swimming motion or actions of a fish or insect.

Often the motion of another fish is the primary attraction in luring a fish to strike. Anglers have instinctively known this for a long time, in that they often play with the line in order to attract, or induce a fish to strike. Vertical motions in particular are often performed by anglers to simulate motion of a live fish or insect, since such weighted lines are especially susceptible to such motions.

It is surprising then, that designers of fishing lures have neglected to fashion their lures with realistic motion simulation as the primary attraction.

U.S. Pat. No. 1,677,176 (reissued as U.S. Pat. No. 22,032) issued to Donaly discloses an artificial fish bait having a buoyant body portion which is tapered to form a reduced neck. Hooks are attached directly to the body portion. Wings are hinged to opposite sides of the body portion by means of a transverse slot in each wing and a strip of sheet metal formed into a loop. The looped strip has a front end portion with increased width to form forward stop means for the wings.

U.S. Pat. No. 2,556,683 issued to Deitz discloses a fishing lure having lateral fins directly attached to the body portion of the fishing lure by means of pins. The fishing lure body itself forms a stop, beyond which the lateral fins cannot move, to simulate fins against the side of a small fish, as occurs in nature.

U.S. Pat. No. 3,396,484 issued to Clark discloses a fishing sinker having spaced apart prong pairs connected to the fishing sinker body. Connected to each prong member is a coil spring to bias the corresponding prong member when in its forward position. Unfortunately, the coil springs of this fishing sinker represent a cumbersome and relatively expensive mechanism for controlling the prongs.

The present invention features a fishing lure that has as its primary attractive feature the simulation of fish and insect motions and actions.

The simulated motion of the inventive lure is provided without the requirement of playing the line. That is, the lure will automatically simulate the motion of a fish or insect in response to the tidal action of the sea, or the bobbing motion of a float.

The enjoyment of the angler in playing with the line is not eliminated, but rather enhanced, because the motion of the inventive lure adds to the deceptive motion. The additional automatic motion simulation allows for continuous attraction even when the line is not being pulled or jerked.

SUMMARY OF THE INVENTION

This invention features a fishing lure that simulates the swimming action or motions of a fish or insect.

The fishing lure comprises a body section that is designed to look like the body of a fish or insect. To this body section, a number of articulated members having bifurcated ends are hinged, such that as the lure is caused to move up and down in the water, theses articulated members will be forced to swing a out their respective hinge point through all angles relative to the body section major axis.

The articulated members can be designed to look like fins and/or tail portions of the fish, or wings of an insect.

In this manner, the lure will provide the appearance of fin or wing movements, and the simulation of a swimming fish or insect.

It is an object of this invention to provide an improved fishing lure that adds action as well as appearance to the attractive forces for causing a fish to strike.

It is another object of the invention to provide a fishing lure that simulates the swimming motion or actions of a fish or insect.

BRIEF DESCRIPTION OF THE DRAWINGS

A complete understanding of the present invention may be obtained by reference to the accompanying drawings, when taken in conjunction with the detailed description thereof and in which:

FIG. 1 is a perspective view of a fishing lure designed in accordance with this invention;

FIG. 2 is a perspective view of an alternate embodiment of the fishing lure shown in FIG. 1;

FIG. 3 is a perspective view of another alternate embodiment of the fishing lure shown in FIG. 1;

FIGS. 4a and 4b are perspective top and bottom views, respectively, of an alternate embodiment of FIG. 2, depicting the fishing lure with an additional dorsal fin;

FIG. 4c is a perspective view of the dorsal fin insert depicted in FIGS. 4a and 4b;

FIG. 5 is a top view of yet another alternate embodiment of FIG. 7; and

FIG. 6 is an in situ view of the inventive fishing lure of FIG. 2.

DESCRIPTION OF THE PREFERRED EMBODIMENT

Generally speaking, the invention pertains to a vertical jigging fishing lure that simulates the swimming motion or action of a fish or insect, in order to provide an inducement for a fish to strike at the bait.

For purposes of brevity, like elements will have the same designation throughout the figures.

Now referring to FIG. 1, a fishing lure 10 of this invention is illustrated. The fishing lure 10 comprises a main body section 11, which is designed to simulate the body of a fish or insect, but is shown here without markings. The body section 11 can be fabricated from plastic, wood or metal, as is traditional in the art.

At the forward end 12 of the body section 11 is a ring 13 for securing the fishing lure 10 to a line (not shown).

At the rearward portion 14 of body section 11 is attached a hook device 15. The hook device 15 can have a single or multiple prong hook, with or without feathering 16.

Two articulated arms 17, each having bifurcated ends, are hinged to the body section 11 about a common hinge pin 18.

Slots 19 in arms 17 form the aforementioned bifurcated arm ends and provide limits for swinging movement (arrows 20) of the arms 17 about hinge pin 18. Moreover, slots 19 allow arms 17 to swing closer to body section 11 in the retracted position of arms 17, as proximal portions of body section 11 fit within respective slots 19, whose widths are greater than the width of body section 11.

The swinging movement 20 of arms 17 is designed to simulate the swimming movement or action of fins, in the case of a fish, or wings in the case of an insect. To this purpose, arms 17 can be fashioned to look like fins or wings, and can be fabricated from flexible or rigid materials The swimming movement 20 of arms 17 will be explained in more detail with reference to FIG. 6.

FIG. 6 illustrates a typical vertical jigging fish lure 10 of this invention, as it is used in situ in a substantially vertical orientation with respect to the surface of the water. The fishing lure 10 is tied to a fishing line 21 via ring 13. The line 21 can be attached to a float 22 as shown, which in turn is connected to a fishing pole 23 having a reel 24, or the line 21 can be directly connected to the reel 24.

The fishing lure 10 and float 22 drift in the water 26, and move up and down (arrows 25) under the tidal action of the sea.

When the lure 10 is caused to move up and down, the arms 17 will be caused to swing (arrows 20) about body 11 of the fishing lure 10, thus simulating the swimming movement of a fish.

If the angler (not shown) plays the rod 23 back and forth (arrows 27), this will also cause arms 17 to swing about the body section 11 of the lure 10.

Referring to FIG. 2, another embodiment of the lure 10 of FIG. 1 is shown.

The lure 10 of FIG. 2 features two arms 17 that are individually hinged about their own hinges 18', rather than the single hinge 18, depicted in FIG. 1. Arms 17 are also provided with holes 28 for securing other hooks or feathers.

Referring to FIG. 3, another embodiment of the fishing lure 10 of FIG. 7 is depicted.

The fishing lure 10 of this figure features an articulated arm 17 that is bifurcated to provide another articulated section 29.

Section 29 is hinged to the arm 17 by means of two rings 30, that pass through holes 31 in the arm 17 and in section 29, respectively.

Section 29 is itself free to swing (arrows 32) about arm 17 and body section 11.

Referring to FIGS. 4a and 4b, top and bottom views are respectively shown of a further embodiment of the fishing lure 10, illustrated in FIG. 2. This fishing lure 10 features the addition of a dorsal fin 35 (shown in FIG. 4c), that can be inserted into a slot 36 (FIG. 4b) of body section 11, as shown.

This dorsal fin 35 features a hole 37 for the attachment of ring 13' to which the fishing line 21 (FIG. 6) is secured.

The front end 12' of the fishing lure 10 is curved to simulate bodily movement.

Referring to FIG. 5, a top view of still another embodiment of the fishing lure 10 of FIG. 1 is illustrated.

The body section 11' of this fishing lure 10 is divided into several articulated sections 11a, 11b and 11c, respectively, as shown.

Each of the sections 11a and 11c of body section 11' is respectively free to swing (arrows 40) about mid-section 11b, via ring connectors 39, that pass through holes 38, respectively.

The articulated body section 11' provides for simulated movement.

Having thus described the invention, what is desired to be protected by Letters Patent is presented by the appended claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A fishing lure for simulating the swimming motions and actions of a fish or insect when caused to move back and forth under the tidal action of the sea, comprising:

a substantially flat planar body section having two flat parallel surfaces and substantially perpendicular side surfaces simulative of a body of a fish or insect as viewed in profile having means defining apertures perpendicular to said two flat parallel surfaces disposed therein at distal ends thereof, and first and second attachment portions comprising first and second ring fasteners disposed in said apertures;

said first ring fastener for securing a line to said first attachment portion of said body section, and a hook to said second ring fastener disposed in the aperture of said second attachment portion of said body section; and at least one articulated wing-like member hinged perpendicular to said flat parallel body surfaces for providing a simulation of motion of a part of said body of said fish or insect, said articulated member having a slot therein for receiving a portion of said flat body section, and lying substantially flush to an outer surface thereto when said articulated member is in a retracted position and movable back and forth over said outer surface of said body section under the influence of the tidal action of the sea, said fishing lure giving the appearance of a swimming fish or insect under said tidal action of the sea by reason of the back and forth movement of said articulated member.

2. The fishing lure of claim 1, wherein there are two articulated members hinged to said body section.

3. The fishing lure of claim 2, wherein one of said two articulated members is free to swing about its hinge in a clockwise direction, and the other one of said two articulated members is free to swing about its hinge in a counter clockwise direction.

4. The fishing lure of claim 3, wherein said two articulated members are hinged about a common hinge point.

5. The fishing lure of claim 2, wherein said two articulated members are hinged about a common hinge point.

6. The fishing lure of claim 3, wherein said two articulated members are spaced-apart from each other.

7. The fishing lure of claim 2, wherein said two articulated members are spaced-apart from each other.

8. The fishing lure of claim 3, wherein said two articulated members simulate the motion of fins or wings.

9. The fishing lure of claim 2, wherein said two articulated members simulate the motion of fins o wings.

10. The fishing lure of claim 1, further comprising at least one member attached to said body section simulative of a dorsal fin.

11. The fishing lure of claim 10, wherein the simulative dorsal fin member is hinged to said body section.

12. The fishing lure of claim 1, wherein said body section is articulated into a plurality of sections.

13. The fishing lure of claim 1, wherein said articulated member is hinged about a mid-portion thereof.

14. A fishing lure for simulating the swimming motions and actions of a fish or insect under the influence of tidal motions of the sea, comprising:
a substantially flat planar body section having two flat parallel surfaces and substantially perpendicular side surfaces simulative of a body of a fish or insect as viewed in profile having means defining apertures perpendicular to said two flat parallel surfaces disposed therein at distal ends thereof, and first and second attachment portions comprising first and second ring fasteners disposed in said apertures;
said first ring fastener for securing a line to said first attachment portion of said body section, and a hook to said second ring fastener disposed in the aperture of said second attachment portion of said body section; and two articulated members hinged perpendicularly to said flat parallel body surfaces section simulative of fins of a fish or wings of an insect, said articulated members each moving back and forth over an outer surface of said body section under the influence of the tidal movement of the sea, and each of said articulated members having a slot for receiving a portion of said body section and lying substantially flush to said outer surface thereto in a retracted position, whereby said fishing lure will give the appearance of a swimming fish or insect.

15. The fishing lure of claim 14, wherein said two articulated members are hinged about a common hinge point.

16. The fishing lure of claim 14, wherein said two articulated members are spaced apart, each moving back and forth about a respective hinge.

17. The fishing lure of claim 14, wherein said body section comprises an articulated member that includes a plurality of sections.

18. The fishing lure of claim 14, wherein at least one of said articulated members is hinged about a mid-portion thereof.

19. The fishing lure of claim 14, further comprising a simulated dorsal fin member attached to said body section.

* * * * *